US 9,067,620 B2

(12) United States Patent
Jang

(10) Patent No.: US 9,067,620 B2
(45) Date of Patent: Jun. 30, 2015

(54) EMERGENCY STEERING SYSTEM OF CONSTRUCTION EQUIPMENT

(75) Inventor: In Pyo Jang, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 158 days.

(21) Appl. No.: 13/817,569

(22) PCT Filed: Aug. 11, 2011

(86) PCT No.: PCT/KR2011/005897
§ 371 (c)(1),
(2), (4) Date: Feb. 19, 2013

(87) PCT Pub. No.: WO2012/023755
PCT Pub. Date: Feb. 23, 2012

(65) Prior Publication Data
US 2013/0146386 A1 Jun. 13, 2013

(30) Foreign Application Priority Data
Aug. 19, 2010 (KR) .......................... 10-2010-0080170

(51) Int. Cl.
*B62D 5/00* (2006.01)
*B62D 5/30* (2006.01)
(Continued)

(52) U.S. Cl.
CPC . *B62D 5/30* (2013.01); *E02F 9/225* (2013.01); *F04B 49/10* (2013.01); *B62D 5/06* (2013.01); *E02F 9/226* (2013.01); *E02F 9/2289* (2013.01); *E02F 9/2296* (2013.01)

(58) Field of Classification Search
CPC .................................. B62D 5/003; B62D 5/32
USPC ..................... 180/405, 406; 60/403, 404, 405
See application file for complete search history.

(56) References Cited

U.S. PATENT DOCUMENTS 3,896,618 A * 7/1975 Smith et al. ..................... 60/405
4,114,720 A * 9/1978 Ericson et al. ................ 180/403
(Continued)

FOREIGN PATENT DOCUMENTS

KR 10-2006-0078298 A 7/2006
KR 10-0656058 B1 12/2006
(Continued)

OTHER PUBLICATIONS

Search Report dated Feb. 28, 2012 written in Korean with English translation attached for International Application No. PCT/KR2011/005897, filed Aug. 11, 2011, 5 pages.

*Primary Examiner* — Joseph Rocca
*Assistant Examiner* — Conan Duda
(74) *Attorney, Agent, or Firm* — John D. Veldhuis-Kroeze; Westman, Champlin & Koehler, P.A.

(57) ABSTRACT

The present disclosure relates to construction machinery such as an excavator or a wheel loader, and more particularly, to an emergency steering apparatus for construction machinery, capable of controlling a steering operation at the time of emergency in which a part of equipment malfunctions or is in an inoperable state. More specifically, an emergency steering apparatus for construction machinery according to an exemplary embodiment of the present disclosure includes: a steering actuator; an emergency hydraulic pump connected to the steering actuator through a pair of driving flow paths; an emergency steering unit configured to receive working oil, which is discharged from the emergency hydraulic pump, and operate a steering means; and an emergency steering controller configured to control whether or not the emergency hydraulic pump is operated.

3 Claims, 2 Drawing Sheets

(51) Int. Cl.
*E02F 9/22* (2006.01)
*F04B 49/10* (2006.01)
*B62D 5/06* (2006.01)

(56) References Cited

U.S. PATENT DOCUMENTS

| | | | |
|---|---|---|---|
| 4,190,130 A * | 2/1980 | Beck | 180/406 |
| 4,365,573 A * | 12/1982 | Jamieson | 114/150 |
| 4,453,451 A * | 6/1984 | Streeter et al. | 91/28 |
| 4,574,904 A * | 3/1986 | Goode | 180/406 |
| 4,955,445 A * | 9/1990 | Kauss | 180/406 |
| 5,352,063 A * | 10/1994 | Allen et al. | 404/84.1 |
| 6,102,150 A * | 8/2000 | Bohner et al. | 180/403 |
| 6,131,389 A * | 10/2000 | Sørensen | 60/384 |
| 6,354,184 B1 * | 3/2002 | Hansen et al. | 91/418 |
| 6,386,312 B1 * | 5/2002 | Sevelsted | 180/417 |
| 6,594,993 B1 * | 7/2003 | Friedrichsen et al. | 60/442 |
| 7,200,993 B2 * | 4/2007 | Khalil et al. | 60/403 |
| 8,397,858 B2 * | 3/2013 | Krahn | 180/406 |
| 2008/0238187 A1 * | 10/2008 | Garnett et al. | 303/112 |
| 2010/0018727 A1 * | 1/2010 | Carlton et al. | 172/1 |
| 2010/0018728 A1 * | 1/2010 | Bright et al. | 172/3 |
| 2010/0023227 A1 * | 1/2010 | Storer et al. | 701/48 |
| 2010/0059306 A1 * | 3/2010 | Langkamp et al. | 180/406 |
| 2011/0297473 A1 * | 12/2011 | Krahn | 180/422 |

FOREIGN PATENT DOCUMENTS

| | | |
|---|---|---|
| KR | 10-0779349 B1 | 11/2007 |
| KR | 10-2008-0056908 A | 6/2008 |
| KR | 10-2008-0058938 A | 6/2008 |
| WO | WO 2008069552 A1 * | 6/2008 ............ B62D 5/097 |

\* cited by examiner

EMERGENCY STEERING SYSTEM OF CONSTRUCTION EQUIPMENT

This Application is a Section 371 National Stage Application of International Application No. PCT/KR2011/005897, filed Aug. 11, 2011 and published, not in English, as WO2012/023755 on Feb. 23, 2012.

FIELD OF THE DISCLOSURE

The present disclosure relates to construction machinery such as an excavator or a wheel loader, and more particularly, to an emergency steering apparatus for construction machinery, capable of controlling a steering operation at the time of an emergency in which a part of the equipment malfunctions or is in an inoperable state.

BACKGROUND OF THE DISCLOSURE

In general, construction machinery such as a wheel type excavator or a wheel loader changes a traveling direction by supplying working oil, which is discharged from a pump, to a steering actuator. More specifically, when an operator manipulates a steering handle, a steering unit discharges the working oil at a flow rate proportional to a rotational speed of the steering handle, the working oil is supplied to the steering actuator through a steering valve, and as a result the steering actuator moves a traveling apparatus to perform a steering operation.

However, when abnormality of a hydraulic circuit occurs or construction machinery of electronic equipment is not normally operated, because a discharge flow rate may not be adjusted by both steering actuators, such that there is a concern that safety of the operator may be at risk and damage of the equipment and an accident may occur.

Therefore, development is required on an emergency steering apparatus for construction machinery having an emergency steering apparatus capable of protecting the operator and the equipment when a flow rate of the working oil is not controlled due to abnormality of each part.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure has been made in an effort to solve the aforementioned problem and an object thereof is to provide an emergency steering apparatus for construction machinery, capable of protecting an operator and equipment when the construction machinery is not normally operated due to abnormality of the equipment, and accordingly a discharge amount of working oil may not be controlled.

In order to achieve the above object, an emergency steering apparatus for construction machinery according to the present disclosure includes: a steering actuator 10; a closed circuit 30 formed by a hydraulic pump 20 capable of discharging working oil in both directions, and a pair of driving flow paths 31 and 32 which connects the steering actuator 10; an emergency hydraulic pump 220; an emergency steering valve 247 which is supplied with the working oil from the emergency hydraulic pump 220 through a first supplying flow path 80; an emergency steering unit 240 configured to switch the emergency steering valve 247 while being operated together with a manipulation of an operator; and second and third supplying flow paths 81 and 82 configured to connect an outlet of the emergency steering valve 247 and the pair of driving flow paths 31 and 32, respectively.

According to an exemplary embodiment of the present disclosure, the emergency steering apparatus may include: a flushing valve 33 configured to drain the working oil of any one of the pair of driving flow paths 31 and 32 while being switched by a pressure difference between the pair of driving flow paths 31 and 32; and a pair of check valves 37 installed at the pair of driving flow paths 31 and 32 to be disposed between the flushing valve 33 and the hydraulic pump 20, and opened when the working oil is supplied to the pair of driving flow paths 31 and 32 from the hydraulic pump 20, in which the flushing valve 33 is opened when pressure of any one of the pair of driving flow paths 31 and 32 is higher than that of the other as the working oil is supplied by any one of the second and third supplying flow paths 81 and 82, to drain the working oil which is discharged to the other of the pair of driving flow paths 31 and 32.

Meanwhile, the emergency steering apparatus may further include: a steering means 45 to which a rotational manipulation signal of the operator is inputted in a normal state; a sensor 45a configured to output rotational driving information of the steering means when the steering means is rotated; an equipment controller 100 configured to receive the rotational driving information of the steering means from the sensor and output a control signal; and a swash plate control valve 162 switched while being controlled by the equipment controller 100, and configured to supply the working oil to a swash plate driving cylinder 61 which drives a swash plate 21 of the hydraulic pump 20 when being switched, in which the emergency steering unit 240 includes: a first link 245 rotated together with the rotation of the steering means 45; and a second link 246 configured to connect the first link 245 and the emergency steering valve 247 to reciprocatingly move the emergency steering valve 247 when the first link 245 is rotated.

The emergency steering apparatus for construction machinery according to an exemplary embodiment of the present disclosure may control a discharge amount of working oil, which flows to a steering actuator, by an emergency hydraulic pump and an emergency steering controller, which are operated at the time of an emergency, and an emergency steering unit which is operated according to the operation of the emergency hydraulic pump and the emergency steering controller, separately from a controller and a hydraulic pump which are operated in a normal state, and thus may protect the operator and the equipment at the time of emergency.

In addition, because a radius of a gyration of a steering means may be limited according to a linear motion stroke of an emergency steering valve, an additional structure for maintaining a manipulation range of a steering means and a neutral state is not necessary in a case in which an electronic steering means is used, and therefore a more simple structure may be provided.

DETAILED DESCRIPTION

Hereinafter, an emergency steering apparatus for construction machinery according to each exemplary embodiment of the present disclosure will be described in detail with reference to the drawings.

Figure 1:
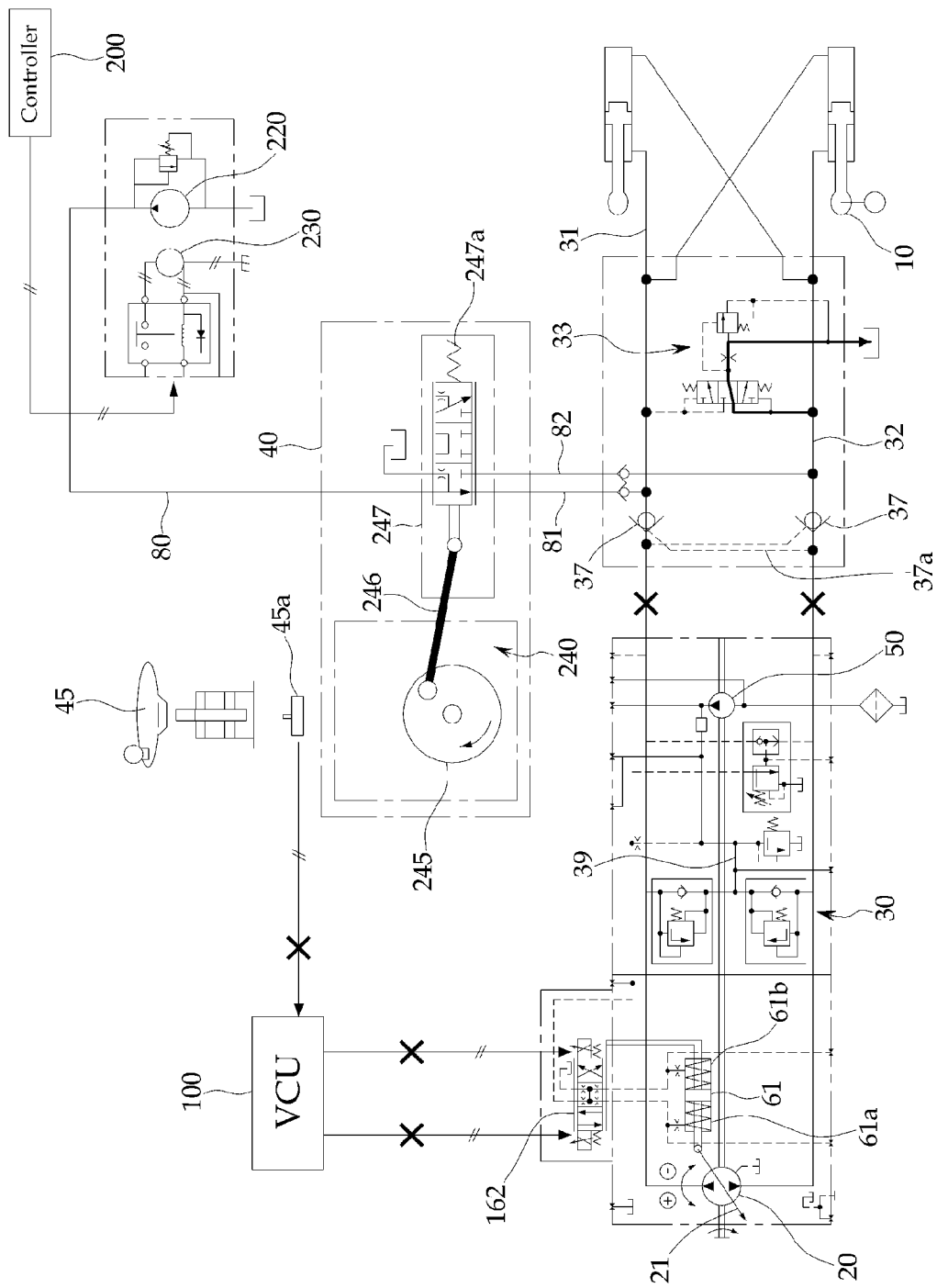
FIG. 1 is a hydraulic circuit view schematically illustrating an emergency steering apparatus for construction machinery according to an exemplary embodiment of the present disclosure.

Referring to FIG. 1, an emergency steering apparatus for construction machinery according to an exemplary embodiment of the present disclosure includes a steering actuator 10, an emergency hydraulic pump 220, an emergency steering unit 240, an emergency steering valve 247, and an emergency steering controller 200.

The steering actuator 10 is provided to steer a steering wheel and installed in typical construction machinery as a form of a pair of cylinders. When one of the steering actuators 10 is extended and the other is retracted, a steering operation of the equipment is possible. In general, the extension and retraction drive of the steering actuator 10 is performed in accordance with a direction in which working oil is supplied.

The emergency hydraulic pump 220 is driven while being connected to a driving source such as an engine or an electric motor which is not illustrated. In the present exemplary embodiment, the emergency hydraulic pump 220 is supplied with power from a motor 230 which is driven while being supplied with electric power from a battery (not illustrated) of equipment that is not illustrated. Accordingly, even in a case in which the steering actuator 10 is not supplied with hydraulic pressure due to damage of hydraulic components, emergency steering may be performed by supplying working oil to the steering actuator 10 using the emergency hydraulic pump 220.

The emergency steering unit 240 is provided to change a discharge direction and a discharge flow rate of the working oil that is supplied to the steering actuator 10 according to a manipulation direction and a manipulation amount of a steering means 45. This function may be implemented in various methods such as installing a manipulation apparatus which outputs an electronic signal, and an emergency steering valve which controls an operation of supplying the working oil based on a manipulation signal of the manipulation apparatus. The emergency steering unit 240 in the present exemplary embodiment includes the steering means 45, a first link 245, and a second link 246.

The steering means 45 is configured as a form of a steering wheel that is generally used, and makes a rotational manipulation of an operator possible.

The emergency steering valve 247 is connected to the emergency hydraulic pump 220 through a first connecting flow path 80 to be supplied with the working oil from the emergency hydraulic pump 220. The supplied working oil is supplied to the steering actuator 10 through any one of second and third connecting flow paths 81 and 82 by switching the emergency steering valve 247.

The first link 245 and the second link 246 are provided to convert a rotational operation of the steering means 45 into a reciprocating motion to drive the emergency steering valve 247. The first link 245 is rotated together with a rotation of the steering means 45. To this end, although the first link 245 and the steering means 45 may be connected to each other in various methods, in the present exemplary embodiment, the first link 245 is connected to a rotating shaft of the steering means 45, and as a result, an operation of the steering means 45 is identically transmitted to the first link 245. Accordingly, no more additional components are needed to connect the steering means 45 and the first link 245, thereby simplifying a structure of the apparatus. Meanwhile, each of both ends of the second link 246 is rotatably connected to the first link 245 and the emergency steering valve 247. Accordingly, the emergency steering valve 247 is reciprocatingly moved when the first link 245 is rotated by the manipulation of the steering means 45.

In the driving operation of the emergency steering apparatus, the operator may select an emergency steering operation and control the steering operation by manipulating an additional switch. In the present exemplary embodiment, the emergency steering operation may be selected by the additional emergency steering controller 200. In a case in which the emergency steering controller 200 is used, the emergency steering controller 200 operates the motor 230 to operate the emergency hydraulic pump 220 at the time of an emergency. A condition of an emergency state in which the emergency steering controller 200 is operated may be set in accordance with a design. For example, the emergency steering apparatus may be designed to enter an emergency steering step when a traveling speed of the construction machinery is equal to or more than 5 km/h, a pump control unit, which adjusts a discharge amount of a hydraulic pump during a normal operation, is not controlled, and all pressure sensors provided in the first driving flow path 31 and the second driving flow path 32 indicate pressure equal to or less than reference pressure. In a case in which the pressure sensor detects pressure equal to or less than the reference pressure, it may be considered that there is absolutely no discharge flow rate or the working oil is leaked out due to damage of a pipe through which the working oil flows.

Meanwhile, the emergency steering apparatus of the present exemplary embodiment is installed in a closed-circuit-driving type steering apparatus including a bi-directional hydraulic pump 20. The steering apparatus will be described in brief below.

The steering apparatus includes a steering actuator 10, a hydraulic pump 20, a closed circuit 30 which connects the hydraulic pump 20 and the steering actuator 10 through the first and second driving flow paths 31 and 32, and a pump control unit 60 which controls a direction and a flow rate of the working oil that is supplied to the steering actuator 10 from the hydraulic pump 20.

The hydraulic pump 20 is driven while being connected to a driving source such as an engine or an electric motor which is not illustrated, and a discharge flow rate and a discharge direction of the working oil is changed in accordance with an inclined angle of a swash plate 21. That is, bi-directional supply of the working oil is possible in which the hydraulic pump 20 discharges the working oil into the first driving flow path 31 and sucks the working oil through the second driving flow path 32 when the swash plate 21 is inclined in a '+' direction, and the hydraulic pump 20 discharges the working oil into the second driving flow path 32 and sucks the working oil from the first driving flow path 31 when the swash plate 21 is inclined in a '−' direction. Accordingly, a hydraulic circuit, which supplies the working oil to the steering actuator 10, may be configured as a closed circuit. Here, the discharge flow rate is changed in accordance with the inclined angle of the swash plate 21.

The closed circuit 30 connects the hydraulic pump 20 and the steering actuator 10 through the first and second driving flow paths 31 and 32. Therefore, the working oil, which is discharged from the hydraulic pump 20, is supplied to the steering actuator 10 through any one flow path of the first and second driving flow paths 31 and 32, and the working oil, which is discharged from the steering actuator 10, flows into the hydraulic pump 20 through the other flow path of the first and second driving flow paths 31 and 32.

The pump control unit 60 is provided to control a discharge flow rate and a discharge direction of the hydraulic pump 20 according to the manipulation of the steering means 45, and includes a swash plate driving cylinder 61, and a swash plate control valve 62.

One side of the swash plate driving cylinder 61 is connected to the swash plate 21 of the hydraulic pump 20 to drive the swash plate 21 to be inclined in one direction or the other direction. The swash plate driving cylinder 61 is driven by the working oil which is supplied from the exterior and whose supply direction is changed by the swash plate control valve 62. To this end, the swash plate driving cylinder 61 includes chambers 61a and 61b to which the working oil is supplied, and an inclined driving direction and an inclined driving amount of the swash plate 21 are determined in accordance with whether the working oil is supplied to each of the chambers 61a and 61b and a supply flow rate. The inclined driving amount of the swash plate 21 determines a discharge flow rate of the hydraulic pump 20, and the inclined driving direction of the swash plate 21 determines a discharge direction of the hydraulic pump 20.

The swash plate control valve 162 used in the present exemplary embodiment has a form of an electronic control type valve, and driving control thereof is performed by a vehicle control unit (VCU) 100 that is an equipment controller. When the swash plate control valve 162 is driven by control of the VCU 100, the working oil, which is on standby at an input side of the swash plate control valve 162, is supplied to the swash plate driving cylinder 61, the swash plate 21, for the electronic control, a rotational manipulation amount and a manipulation direction of the steering means 45 of the present exemplary embodiment are detected by a sensor 45a.

Meanwhile, a flushing valve 33 is installed in the steering apparatus including the closed circuit 30 of the present exemplary embodiment. The flushing valve 33 is provided to drain the heated working oil of the closed circuit 30 when new working oil is supplied to the first and second driving flow paths 31 and 32 by a charging pump 50 that will be described below. More specifically, the flushing valve 33 is driven by hydraulic pressure of a flow path, where higher pressure is formed, among the first driving flow path 31 and the second driving flow path 32. For example, it is assumed that the working oil is supplied to the steering actuator 10 through the first driving flow path 31, and the working oil of the steering actuator 10 is discharged to the hydraulic pump 20 through the second driving flow path 32. In this state, when pressure of the first driving flow path 31 becomes higher than pressure of the second driving flow path 32 as a load is applied to the steering actuator 10, the flushing valve 33 is converted to drain the working oil of the second driving flow path 32. The opposite situation is identical to this situation except that the working oil of the first driving flow path 32 is drained.

The charging pump 50 is a pump which supplements a flow rate to the closed circuit 30 where the working oil is drained by driving the flushing valve 33, as described above. It may be considered that additional supply of the working oil is not necessary because the working oil of the closed circuit 30 circulates through the first and second driving flow paths 31 and 32, the hydraulic pump 20, and the steering actuator 10, but additional supply of the working oil by the charging pump 50 is required because the working oil is drained through the flushing valve 33 or the like. To this end, similarly to the hydraulic pump 20, the charging pump 50 of the exemplary embodiment is always driven together with an operation of the engine (not illustrated). The working oil thus generated is supplied to the closed circuit 30 through a working oil supplement line 39 when a pressure of the closed circuit 30 becomes low at a predetermined value or less.

In the emergency steering apparatus of the present exemplary embodiment described above, an outlet of the emergency steering valve 247 is connected to the first and second driving flow paths 31 and 32 through the second and third supplying flow paths 81 and 82. An operation according to the above configuration will be described below. First, in a case in which the working oil is supplied through the second supplying flow path 81, the steering actuators 10 are driven as the working oil is supplied through the first driving flow path 31, and the working oil is discharged through the second driving flow path 32. The working oil, which is discharged through the second driving flow path 32, is drained through the flushing valve 33 which is opened by an increase in pressure of the first driving flow path 31. In a case in which the working oil is supplied through the third supplying flow path 82, the working oil flows in a direction opposite to the direction that is described above, and is finally drained to a tank through the flushing valve 33.

Meanwhile, a check valve 37 is installed at each of the first and second driving flow paths 31 and 32 to prevent the working oil supplied through the second and third supplying flow paths 81 and 82 from flowing backward to the hydraulic pump 20. That is, the check valve 37 is installed at each of the first and second driving flow paths 31 and 32 to be disposed between the flushing valve 33 and the hydraulic pump 20. Here, the second and third supplying flow paths 81 and 82 are connected to the first and second driving flow paths 31 and 32 between the steering actuator 10 and the check valve 37. However, in a case in which the working oil is normally supplied to the steering actuator 10 by the hydraulic pump 20, a problem due to the check valve 37 may occur while supplying the working oil. Therefore, in the present exemplary embodiment, in a case in which the working oil is supplied to any one of the first and second driving flow paths 31 and 32 by the hydraulic pump 20, the emergency steering apparatus is preferably installed as a form in which a signal line 37a is applied to each of the check valves 37 so that the check valves 37, which are installed at the other flow path, are opened by the pressure.

Meanwhile, in an aspect such as the present exemplary embodiment in which a steering operation is controlled by using the sensor 45a, an additional apparatus is further needed to limit a manipulation range of the steering means 45, unlike a general mechanical steering means. It has been described above that in a case in which the steering apparatus is configured as described above, the emergency steering apparatus may share the steering means 45 manipulated by the operator, that is, the steering wheel, in a normal state. In this case, the emergency steering unit 240 may further perform a function of limiting a manipulation range of the steering means as well as a function of controlling the emergency steering operation. This is possible because the emergency steering valve 247 is mechanically connected to the steering means 45. That is, a switching range of the emergency steering valve 247 becomes a manipulation range of the steering means 45. Meanwhile, the emergency steering valve 247 may prevent the steering means 45 from being manipulated due to external vibration and impact regardless of the operator's intention. Meanwhile, in order to assist the emergency steering valve 247 in returning back to a neutral state, an elastic body 247a is installed at a side of the emergency steering valve 247. The elastic body 247a assists the steering means 45 in returning back to a neutral state and maintaining a posture thereof in the neutral state.

Figure 2:
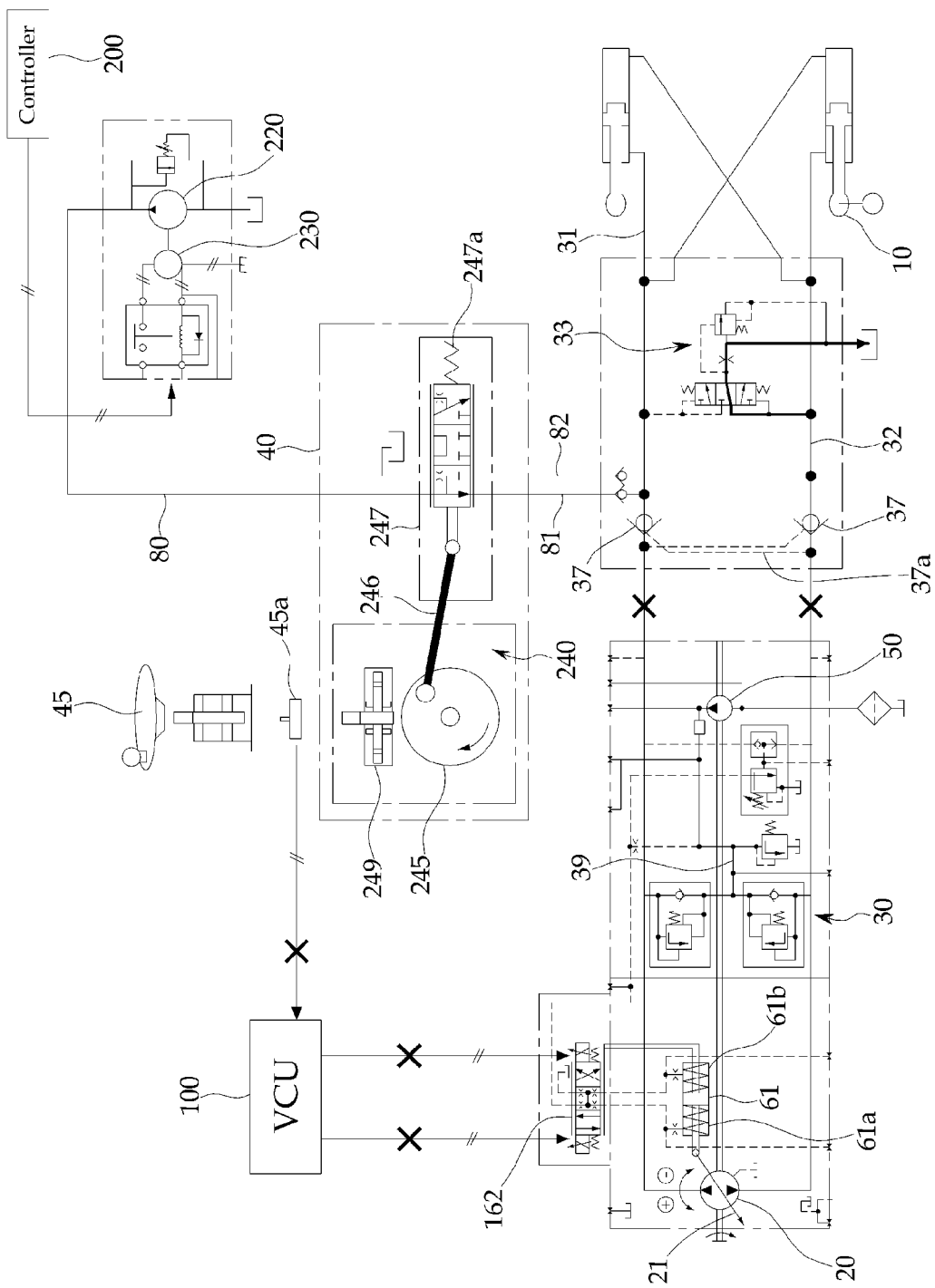
FIG. 2 is a hydraulic circuit view schematically illustrating an emergency steering apparatus for construction machinery according to another exemplary embodiment of the present disclosure.

In addition, FIG. 2 is a hydraulic circuit view schematically illustrating an emergency steering apparatus for construction machinery according to another exemplary embodiment of the present disclosure. According to another exemplary embodiment of the present disclosure, a clutch 249 is installed between the steering means 45 and the emergency steering valve 247 to selectively allow the steering means 45 and the emergency steering valve 247 to be operated together if necessary.

The steering means 45 and the emergency steering valve 247 are selectively operated together by the clutch 249, and as a result, loss of energy due to a permanent mechanical connection may be prevented and improvement on component durability may be achieved.

In addition, an electronic clutch may be used as the clutch 249, and in this case an additional control means, which controls the electronic clutch may be further provided.

Hereinafter, a process of operating the emergency steering apparatus having the configuration described above will be described. First, in a case in which the condition designed by the emergency steering controller 50 is satisfied, an emergency steering step is performed. In this case, the steering unit is controlled by the emergency hydraulic pump 220 and the emergency steering controller 200. When the emergency steering controller 200 operates the motor 230 connected to the emergency hydraulic pump 220, the working oil is discharged from the emergency hydraulic pump 220.

The emergency steering unit 240, which receives the discharged working oil, operates the steering means 45 to adjust a flow rate and a direction of the working oil which is discharged to the first driving flow path 31 or the second driving flow path 32. The working oil, which has flown in the driving flow path, flows in the steering actuator 10 to control a steering operation of the equipment.

The technical spirit of the present disclosure should not be interpreted by limiting the aforementioned embodiment of the present disclosure. The present disclosure is applicable in various fields and those skilled in the art can modify and change the embodiment of the present disclosure in a variety of forms, without departing from the subject matter of the present disclosure, which is claimed in the claims. Therefore, such modifications and changes will be within the protection scope of the present disclosure to the extent that they are apparent to those skilled in the art.

The invention claimed is:

1. An emergency steering apparatus for construction machinery, comprising:
  a steering actuator;
  a bi-directional hydraulic pump capable of discharging working oil;
  a pair of driving flow paths through which the working oil from the bi-directional hydraulic pump is supplied to the steering actuator;
  an emergency hydraulic pump;
  an emergency steering valve which is supplied with the working oil from the emergency hydraulic pump through a first supplying flow path;
  a second and a third supplying flow paths configured to connect an outlet of the emergency steering valve and the pair of driving flow paths, respectively;
  a flushing valve configured to drain the working oil of any one of the pair of driving flow paths while being switched by a pressure difference between the pair of driving flow paths; and
  an emergency steering unit configured to switch position of the emergency steering valve to selectively connect the first supplying flow path to either the second or the third supplying flow paths;
  a pair of check valves installed at the pair of driving flow paths to be disposed between the flushing valve and the bi-directional hydraulic pump, and opened when the working oil is supplied to the pair of driving flow paths from the bi-directional hydraulic pump,
  wherein the flushing valve is opened when pressure of any one of the pair of driving flow paths is higher than that of the other as the working oil is supplied by any one of the second and third supplying flow paths, to drain the working oil which is discharged to the other of the pair of driving flow paths.

2. The emergency steering apparatus of claim 1, further comprising:
  a steering means to which a rotational manipulation signal of an operator is inputted in a normal state;
  a sensor configured to output rotational driving information of the steering means when the steering means is rotated;
  an equipment controller configured to receive the rotational driving information of the steering means from the sensor and output a control signal; and
  a swash plate control valve switched while being controlled by the equipment controller, and configured to supply the working oil to a swash plate driving cylinder which drives a swash plate of the bi-directional hydraulic pump when being switched,
  wherein the emergency steering unit comprises,
  a first link rotated together with the rotation of the steering means; and
  a second link configured to connect the first link and the emergency steering valve to reciprocatingly move the emergency steering valve when the first link is rotated.

3. The emergency steering apparatus of claim 1, further comprising:
  a steering means to which a rotational manipulation signal of an operator is inputted in a normal state;
  a sensor configured to output rotational driving information of the steering means when the steering means is rotated; and
  an equipment controller configured to receive the rotational driving information of the steering means from the sensor and output a control signal,
  wherein a clutch is installed between the steering means and an emergency steering valve, and the steering means and the emergency steering valve are selectively operated together when necessary.

* * * * *